Oct. 1, 1957 R. R. GRAVES 2,808,025
MILKING AND COLLECTING APPARATUS
Filed Nov. 20, 1951 3 Sheets-Sheet 1

INVENTOR.
Roy R. Graves
BY
Wallenstein & Spangenberg
Attys.

United States Patent Office 2,808,025
Patented Oct. 1, 1957

2,808,025

MILKING AND COLLECTING APPARATUS

Roy R. Graves, Germantown, Md., assignor to The Graves-Stambaugh Corporation, a corporation of Delaware Application November 20, 1951, Serial No. 257,211

22 Claims. (Cl. 119—14.01)

This invention relates to a milking and collecting apparatus for withdrawing milk from cows and collecting the withdrawn milk all without contact with air. The milking and collecting apparatus of this invention is particularly useful in practicing the milking process disclosed and claimed in my copending application Ser. No. 95,255, filed May 16, 1949, now Patent No. 2,616,809. This application is a continuation-in-part of said copending application and also of my copending application Ser. No. 781,602, filed October 23, 1947, now Patent No. 2,610,608, of which the aforementioned application is also a continuation-in-part.

Briefly, the process disclosed in the aforementioned copending application Ser. No. 95,225 comprises, at the farm, withdrawing milk from cows without contact with air by means of milking machines, collecting the withdrawn milk from each cow in a transparent weigh jar without contact with air, weighing and inspecting the milk in the weigh jars, and collecting the milk from the weigh jars in a portable vacuum receiving tank without contact with air and at substantially body temperature. This withdrawing and collecting of the milk at the farm without contact with air is accomplished in enclosed lines or pipes utilizing vacuum. The portable vacuum receiving tanks from one or more farms are then promptly transported without substantial cooling to a central processing plant where the milk therein is weighed and collected without contact with air in processing tanks. This milk in these processing tanks, which has not been contacted by air nor subjected to substantial prior cooling, is then withdrawn therefrom in the absence of air, homogenized, rapidly heated at least to pasteurization temperatures or sterilization temperatures and cooled and sealed in suitable containers. The milk processed in this manner in a completely closed system has all of the characteristics and attributes of fresh milk and may be kept over long periods of time. In fact, when the milk is sterilized and packaged in cans, it keeps substantially indefinitely without refrigeration.

The invention herein disclosed has to do with the apparatus for performing the first or farm portion of the complete milking process, namely for withdrawing milk from cows without contact with air, collecting the withdrawn raw milk from each cow in a weigh jar for weighing and inspecting the same, and collecting the raw milk from the weigh jars in a vacuum receiving tank without contact with air and at substantially body temperature.

The principal object of this invention is to provide an improved milking and collecting apparatus which withdraws milk from cows and collects the same in a vacuum receiving tank all without contact with air, which permits the securing of milk of low bacterial content and without oxidation, which is simple in construction and conveniently operated, which may be cleaned and sterilized with a minimum of effort, which is positive and foolproof in operation, and which is inexpensive to manufacture and install.

Briefly, the milking and collecting apparatus of this invention includes a plurality of vacuum pulsator milking devices for withdrawing milk from the cows without contact with air, a transparent weigh jar for each vacuum milking device for inspecting and weighing the withdrawn milk without contact with air, a portable vacuum receiving tank for collecting the withdrawn milk from the weigh jars without contact with air, a vacuum pump for creating vacuum conditions, a vacuum line for applying vacuum to the vacuum pulsator milking devices, and the weigh jars, a vacuum connection to the portable vacuum receiving tank, and a sanitary milk line for transferring milk under vacuum from the weigh jars to the portable vacuum receiving tank. A vacuum connection is provided between each weigh jar and the vacuum line and it includes a valve for controlling the connection. A milk connection is provided between the associated vacuum pulsator milking devices and weigh jars and each connection includes a valve for controlling the same. A milk connection is also provided between each weigh jar and the sanitary milk line and each of these connections is provided with a valve. These various valves may be readily manipulated for controlling the transfer of milk without contact with air from the vacuum pulsator milking devices to the weigh jars and to the sanitary milk line and hence to the portable vacuum receiving tank.

Preferably, a magnetic pulsator is located adjacent to and connected to each vacuum pulsator milking device for operating the same. This provides a more positive milking action. Each magnetic pulsator is preferably connected to a branch of the vacuum line located adjacent each weigh jar. The branch may be a depending branch terminating in a ball check valve. This effectively keeps moisture out of the magnetic pulsator and eliminates one of the reasons for sticking thereof. A valve is located in each branch between the magnetic pulsator and the vacuum line to control the operation of the magnetic pulsator and to prevent cleaning fluid from getting into the magnetic pulsator when cleaning fluid is circulated through the vacuum line. Also, the vacuum connections between the weigh jars and the vacuum line extend from these branches.

The sanitary milk line, the weigh jars and the vacuum line may be cleaned by circulating a cleaning fluid therethrough following the milking operation. In this connection a cleaning fluid circulating apparatus, including a sump and a pump, is connected to the sanitary milk line and the vacuum line, the cleaning fluid being forced by the pump through the sanitary milk line, the weigh jars and the vacuum line to the sump. After cleaning with the cleaning fluid the system may be rinsed by circulating water therethrough. During cleaning and rinsing the portable vacuum receiving tank is disconnected and a detachable bypass connection is applied to the sanitary milk line and to the vacuum connection normally leading to the receiving tank.

The weigh jars which are conveniently located with respect to the operator are of unique construction and withstand the pressures of the cleaning fluid circulated by the pump. The valves for controlling the transfer of milk into and out of each weigh jar take the form of a single valve device located on the bottom of the weigh jar so that it may be readily manipulated by the operator. The valve device also has provisions for venting the vacuum pulsator milking devices to atmosphere when the milk connections between the milking devices and the weigh jars are shut off in order to facilitate removal of the milking devices from the cows.

The raw milk withdrawn from the cows and collected by the apparatus of this invention has an extremely low gas content as compared to raw milk withdrawn and collected by conventional apparatuses where the milk is contacted by air. Various gas content studies of conventional commercial raw milk reveal the average volume percent of oxygen therein as 0.43, 0.47 and 0.49 with maximum values running as high as 0.59 and 0.74. The average volume percent of nitrogen in such milk is found by such studies to be 1.29 and 1.37 and of carbon dioxide to be 3.63 and 4.45. The milk withdrawn and collected into the vacuum receiving tanks by the apparatus of this invention has an average volume percent of 0.22 of oxygen, 1.05 of nitrogen and 1.45 of carbon dioxide. This low gas content of the milk delivered in the vacuum receiving tanks to the processing plant is one of the main contributing factors which permits sterilization and canning of the milk at the processing plant without oxidation of the milk and the production of off flavors caused by oxidation.

The raw milk withdrawn from the cows and collected in the vacuum receiving tanks by the apparatus of this invention has a very low bacteria count and a large bactericidal action takes place in the milk at substantially body temperatures in the vacuum receiving tanks over periods of time extending up to two and one-half or three hours. Experiments show that, because of this bactericidal action there is no increase in the bacterial content of the milk maintained at substantially body temperature under vacuum in the vacuum receiving tanks until two or three hours after milking. This allows a substantial time interval for transporting the milk in the portable vacuum receiving tanks to the central processing tank without any substantial change in the bacterial count. This extended period of bactericidal action is due to both the vacuum under which the milk is maintained, making conditions unfavorable for the growth of aerobic bacteria, and to the initial low bacterial content of the milk. Tests show that the bacteria count of the milk in the vacuum receiving tanks shortly after milking is completed usually runs from about 900 to 4000 per ml. and as pointed out above there is substantially no increase therein over a period of about two and one-half to three hours. Tests also show that over this extended time interval there is no increase in Staphylococci aureas, quite commonly found in milk, and therefore the possibility of enterotoxin, one of the causes of food poisoning, is extremely limited.

Further objects of this invention reside in the details of construction of the milking and collecting apparatus and in the cooperative relationships between the component parts thereof.

Other objects and advantages of this invention will become apparent to those skilled in the art upon reference to the accompanying specification, claims and drawings in which:

Figures 1, 1A:
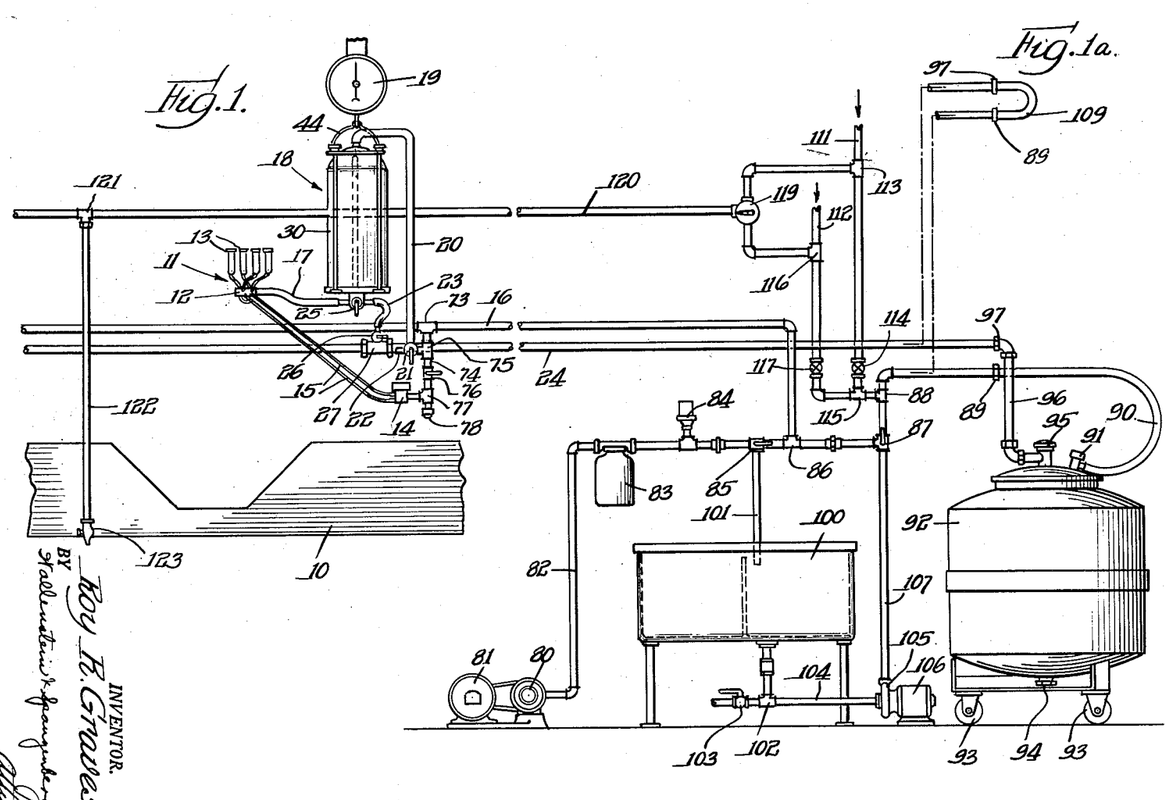
Fig. 1 is an elevational view in the form of a layout illustrating the milking and collecting apparatus of this invention for withdrawing milk from cows and collecting the withdrawn milk in a portable vacuum receiving tank all without contact with air.
Fig. 1a is a partial view illustrating the detachable bypass connection for use with the apparatus of Fig. 1 for the purpose of facilitating cleaning of the same.
Figures 2, 3, 4, 5:
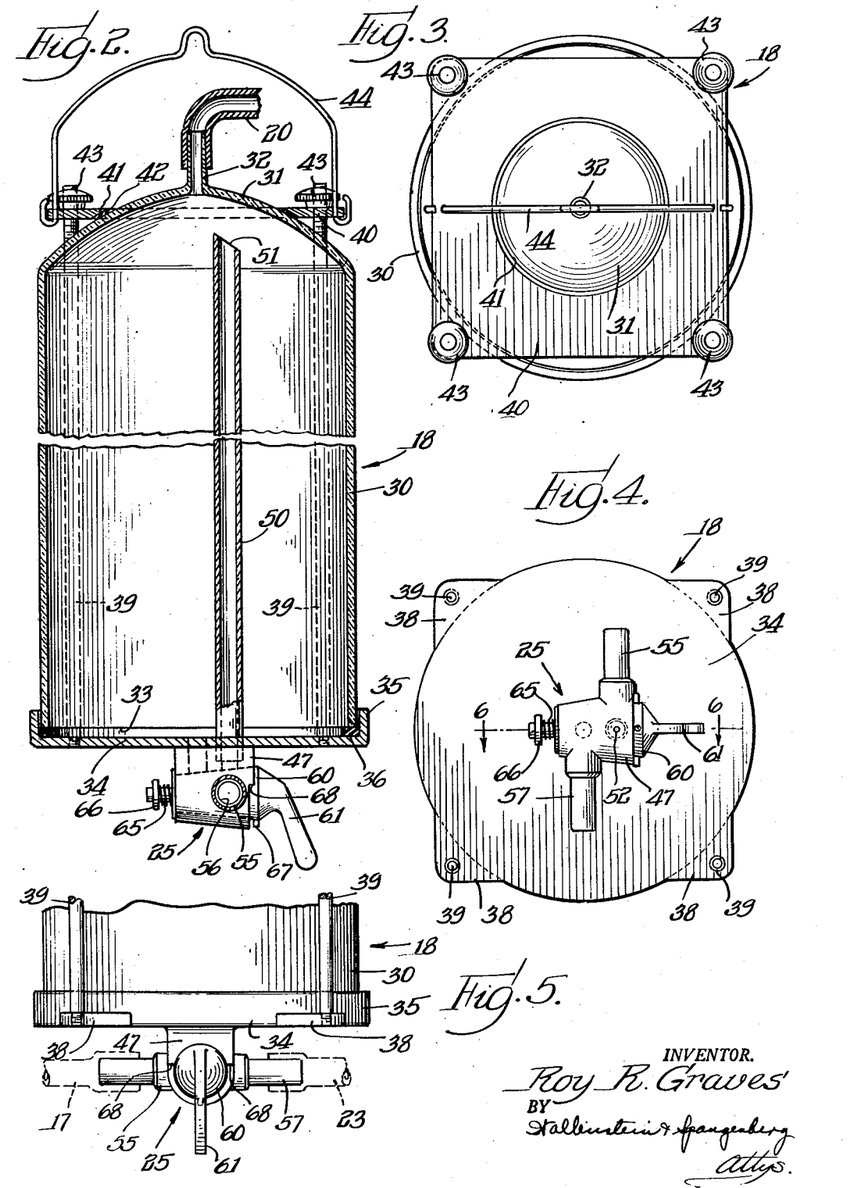
Fig. 2 is an enlarged vertical sectional view through the weigh jar.
Fig. 3 is a top plan view thereof.
Fig. 4 is a bottom plan view thereof.
Fig. 5 is a partial elevational view of the bottom portion of the weigh jar looking from the right of Fig. 2.

Referring first to Fig. 1 there is illustrated a milking and collecting apparatus for withdrawing milk from a plurality of cows and collecting the withdrawn milk in a portable vacuum receiving tank all without contact with air. This milking and collecting apparatus is a multiple arrangement for milking a plurality of cows at a time, Fig. 1 for purposes of simplification illustrating a single milking arrangement. Here a portion of a curb of a multiple milking parlor is designated at 10. The milking parlor may be of the form disclosed in my aforementioned copending application Ser. No. 781,602. This curb extends upwardly from the floor supporting the cows being milked and is substantially waist-high to the operator in the pit so as to facilitate handling of the milking equipment by the operator.

A vacuum pulsator milking device is generally designated at 11 and it includes a manifold 12 and a plurality of teat cups 13 connected thereto. This milking device is of standard construction having flexible liners in the teat cups which are expanded and contracted by the application of vacuum and air thereto for performing the milking operation. A magnetic pulsator 14 is connected by two tubes 15 to the vacuum pulsator milking device 11 for performing the milking operation, this magnetic pulsator 14 being connected to a vacuum line 16. Two tubes 15 are utilized so that the flexible liners of the teat cups are alternately operated by the magnetic pulsator 14. A magnetic pulsator is utilized for each vacuum milking device 11 and is located closely adjacent thereto to maintain the vacuum and air connections therebetween as short as possible. This increases the sharpness of the pulsating action and, therefore, provides increased milking efficiency.

During the milking of a cow the milk is withdrawn by means of vacuum from the vacuum pulsator milking device 11 through a milk connection 17 into a weigh jar generally designated at 18. This weigh jar 18 has transparent side walls so that the milk collected therein from the vacuum pulsator milking device may be visually inspected. The weigh jar 18 is also supported by a scale 19 so that the milking of each cow may be weighed. Vacuum is applied to the weigh jar 18 while a cow is being milked by means of a vacuum connection 20 extending from the top of the weigh jar 18 through a three-way valve 21 to the vacuum line 16. When the three-way valve 21 is moved to one position for milking purposes vacuum from the vacuum line 16 is applied to the weigh jar 18. This vacuum operates to collect the milk from the vacuum pulsator milking device in the weigh jar. When the milking operation is completed and it is desired to withdraw the milk from the weigh jar the vacuum in the weigh jar above the milk is broken by moving the three-way valve 21 to its other position. When this is done, the weigh jar above the milk is connected to a nipple 22 on the three-way valve 21. The nipple 22 may be connected to atmosphere for bleeding in a small amount of air during the interval while milk is being withdrawn from the weigh jar. It is found that the slight amount of air so bled into the weigh jar has substantially no effect upon the characteristics of the milk in the weigh jar. In other words, substantially no oxygen is absorbed by the air contacting the top surface of the milk in the weigh jar. To eliminate any possibility of air contacting the top of the milk in the weigh jar, a source of inert gas such as nitrogen may be connected to the nipple 22 so that this inert gas is bled into the weigh jar during withdrawal of milk therefrom.

Milk is withdrawn from the weigh jar through a milk connection 23 into a sanitary milk line 24. A valve 25 controls the milk connections 17 and 23 to control the supply of milk into and the withdrawal of milk from the weigh jar 18. The milk connection 23 is connected into the sanitary milk line 24 through a shut-off valve 26 and a T-fitting 27 in the sanitary milk line. While Fig. 1 illustrates a single arrangement including a vacuum pulsator milking device, a weigh jar and a vacuum pulsator connected to the vacuum line 16 and the sanitary milk line 24, of course, the apparatus of this invention includes a plurality of such arrangements arranged in parallel.

The construction of the weigh jar 18 and the valve 25 on the bottom thereof is illustrated in more detail in Figs. 2 to 11, inclusive. As shown more clearly in Figs. 2 to 5, the weigh jar having transparent side walls includes a transparent bottle, such as a glass bottle 30, having a closed dome-shaped top 31 in turn provided with a central protruding nipple 32 to which the vacuum connection 20 in the form of a hose is attached. The bottom of the glass bottle 30 is open as indicated at 33 but the bottom of the bottle is normally closed by means of a bottom closure plate 34 having an annular flange 35 which receives a resilient gasket 36. The gasket 36 seats between the bottom of the bottle 30 and the bottom closure plate 34 to seal the weigh jar closed. The bottom closure plate 34 is provided with a plurality of ears 38 which in turn screw-threadedly carry tie rods 39 which extend upwardly therefrom along the outside of the glass bottle 30. The upper ends of the tie rods 39 extend through holes in an upper plate 40 which is provided with a central opening 41. This central opening 41 is provided with a resilient gasket 42 for engaging the top 31 of the glass bottle 30. Hand nuts 43 screw-threadedly carried by the upper ends of the tie rods 39 clamp the bottom and top plates 34 and 40 together with the glass bottle 30 interposed therebetween. The composite weigh jar so constructed is simple in construction, may be readily disassembled and assembled for cleaning purposes and effectively operates to withstand vacuum pressures and positive pressures without leakage. The top plate 40 is also provided with a pair of holes for receiving a supporting bail 44 by which the weigh jar 18 is supported by the scale 19 so that the contents within the weigh jar may be readily weighed. The weigh jar is relatively long with respect to its diameter so that while the weigh jar will receive the milking from a cow, the upper surface of the milk in the weigh jar is relatively small.

The valve 25 which controls the supply of milk to and the discharge of milk from the weigh jar 18 is illustrated in more detail in Figs. 6 to 11 and it includes a valve body or housing 47 integrally formed on the bottom of the bottom plate 34. This valve body 47 has a transverse tapered bore 48. A milk supply port 49 extends upwardly from the bore 48 and carries a tube 50 which extends to a point adjacent the top of the weigh jar so that milk supplied to the weigh jar is supplied to a point adjacent its top. Preferably the top of the tube 50 is cut at a bevel to minimize the tendency of milk getting into the vacuum connection 20 at the top of the weigh jar. The bottom of the valve body 47 is provided with a vent port 52 extending between the bore 48 and atmosphere, this vent port being in alignment with the inlet port 49. The valve body 47 is also provided with a milk outlet port 53 extending between the weigh jar and the bore 48. The milk inlet and outlet ports 49 and 53 are in different vertical planes. The valve body 47 is provided with a fitting 55 extending horizontally therefrom having a milk inlet passage 56 communicating with the bore 48 in a vertical plane containing the milk inlet port 49. The valve body is also provided with another fitting 57 having a milk outlet passage 58 communicating with the bore 48 in a vertical plane containing the milk outlet port 53. The milk connection 17 from the vacuum pulsator milking device to the weigh jar is made to the fitting 55 and the milk connection 23 between the weigh jar and the sanitary milk line is made to the fitting 57.

Figure 6:
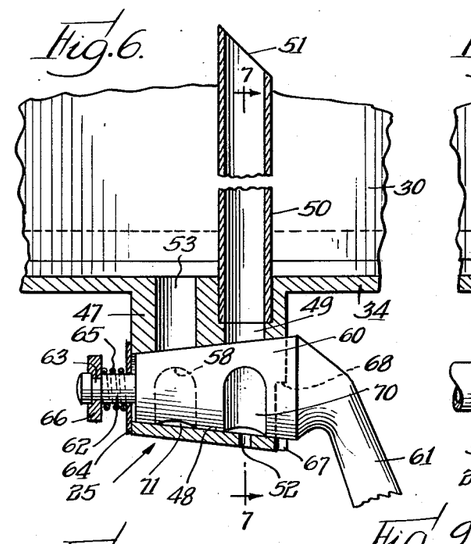
Fig. 6 is an enlarged vertical sectional view through the valve on the bottom of the weigh jar and taken substantially along the line 6—6 of Fig. 4.
Figure 7:
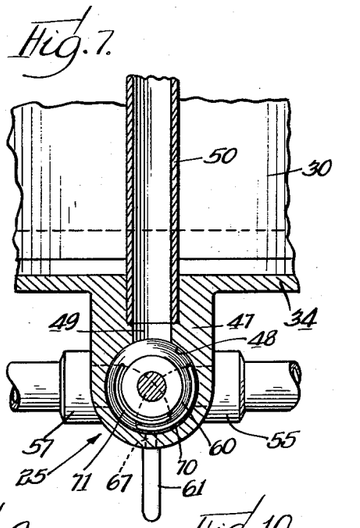
Fig. 7 is a vertical sectional view taken substantially along the line 7—7 of Fig. 6.
Figure 11:
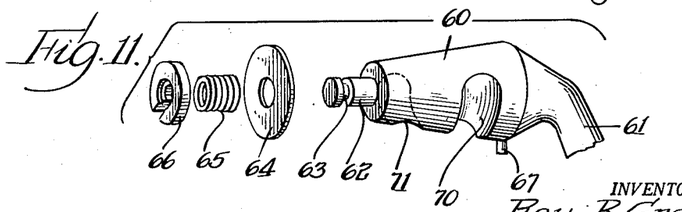
Fig. 11 is an exploded perspective view of the valve plug shown in Figs. 6 and 7.

The tapered bore 48 of the valve body 47 rotatably carries a tapered valve plug 60 having an operating handle 61 on one end. The other end of the valve plug 60 is provided with an extension 62 having a groove 63. After the valve plug 60 is inserted in the valve body 47 a washer 64 is inserted over the extension 62, then a spring 65 is inserted and held in place by a split ring 66 received in the groove 63. The spring 65 operates firmly to seat the valve plug 60 in the valve body 47 but yet provides a simple means for disassembling the valve arrangement for cleaning purposes. The valve plug 60 carries a stop pin 67 which is adapted to engage a pair of shoulders 68 formed in the valve body 47 to limit rotation of the valve plug 60 through substantially 180 degrees.

Figure 8:
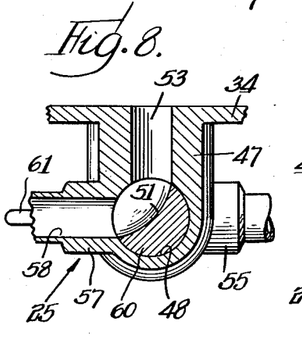
Fig. 8 is a vertical sectional view through the milk outlet portion of the valve showing the valve in position for withdrawing milk from the weigh jar.
Figure 9:
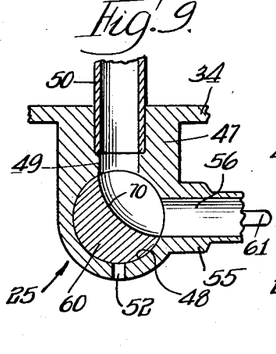
Fig. 9 is a vertical sectional view through the milk inlet portion of the valve showing the valve in the opposite position for collecting milk in the weigh jar.
Figure 10:
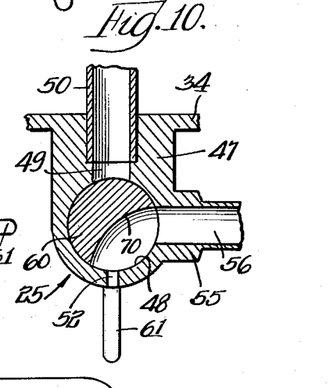
Fig. 10 is a vertical sectional view similar to Fig. 9 but showing the valve in an intermediate position for venting the vacuum pulsator milking device to atmosphere.

The valve plug 60 is provided with a pair of spaced passages 70 and 71, the passage 70 operating to connect and disconnect the milk inlet port and passage 49 and 56 and the passage 71 operating to connect and disconnect the milk outlet port and passage 53 and 58. When the valve plug 60 is moved to a first position, as illustrated in Fig. 9, the plug passage 70 connects the milk inlet port and passage 49 and 56. In this first position the valve plug 60 interrupts the connection between the milk outlet port and passage 53 and 58. When the valve plug 60 is moved out of this first position as, for example, into an intermediate position, as illustrated in Fig. 10, the valve plug 60 closes off the milk inlet port 49 and the plug passage 70 connects the milk inlet passage 56 to atmosphere through the vent port 52. This vents the vacuum pulsator milking device 11 to atmosphere to facilitate removal of the same from the cow. When the valve plug 60 is moved to the other extreme position, that is a second position, the plug passage 71 connects the milk outlet port and passage 53 and 58, as illustrated in Fig. 8. In this position both the milk inlet port 49 and milk passage 56 are closed by the valve plug 60. This valve arrangement is extremely simple in construction, is simple to manipulate and foolproof in operation, and may be readily disassembled and assembled for cleaning purposes.

Instead of making the vacuum connections to the weigh jar 18 and to the magnetic pulsator 14 directly to the vacuum line 16, these connections are preferably made through a branch 74, as illustrated more clearly in Fig. 1. Here each branch 74, which may be a depending branch, is associated with each weigh jar and magnetic pulsator and is connected into the vacuum line 16 by a T-fitting 73. The three-way valve 21 controlling the vacuum connection 20 is connected into the branch 74 by a T-fitting 75. The magnetic pulsator 14 is connected into the branch 74 by a T-fitting 77 and a shut-off valve 76 is located between the T-fitting 77 and the T-fitting 75. This shutoff valve 76 operates to make and break communication between the magnetic pulsator 14 and the vacuum line 16. The branch 74 also terminates in a ball check valve 78 so that any moisture in the vacuum system will drain therethrough and will not collect in the magnetic pulsator 14, which is one of the causes for sticking of the magnetic pulsator. The ball check valve 78 includes a ball which is raised against a seat when vacuum is applied to the magnetic pulsator 14. When the vacuum to the magnetic pulsator is broken, the ball falls from the seat to drain any moisture collecting above the same.

The milking and collecting apparatus of this invention also includes a vacuum pump 80 which may be driven by an electric motor 81, this vacuum pump 80 being connected through a pipe 82, a vacuum trap 83, a vacuum relief valve 84, a three-way valve 85 and a T-fitting 86 to the vacuum line 16 for the purposes of creating a vacuum therein. The vacuum pump 80 is also connected through a three-way valve 87, a T-fitting 88, a breakable connection 89 and a removable connection 90 to a valve 91 of a portable vacuum receiving tank 92 for creating a vacuum therein. This portable receiving tank 92 may be of any desired construction and may take the form of the portable vacuum receiving tank disclosed in my aforementioned copending application Ser. No. 95,225 or in copending application Ser. No. 279,386, filed March 29, 1952, now Patent No. 2,751,123. The vacuum receiving tank 92 may be supported by wheels or casters 93 and may be provided with a drain connection 94. The vacuum receiving tank 92 is also provided with a milk inlet valve 95 which in turn is connected by a removable connection 96 to a breakable connection 97 on the sanitary milk line 24.

The vacuum receiving tank 92 is normally sterilized and provided with an internal vacuum at the central processing plant and shipped to the farmer. When the milking operation by the farmer is started, the vacuum receiving tank 92 is connected to the vacuum pump and the sanitary milk line 24 and then the vacuum pump is started. The valves 91 and 95 on the vacuum receiving tank 92 are opened to produce vacuum conditions in the sanitary milk line 24 as well as in the vacuum receiving tank 92. The valves 76 in the branches are opened to operate the magnetic pulsators 14 and hence the vacuum pulsator milking devices 11. The three-way valves 21 in the vacuum connections 20 to the weigh jars are manipulated to produce vacuum in the weigh jars and the valves 25 are manipulated to establish the milk connection between the vacuum pulsator milking devices and the weigh jars. In this way the cows are milked and the milk from the cows collected in the weigh jars. After each cow is milked and the milk inspected and weighed in the weigh jars the milk is transferred from the weigh jars into the vacuum receiving tank 92, this being accomplished by manipulation of the valves 25 and the three-way valves 21. After the complete herd is milked the valves 76 in the branches are closed to shut off the magnetic pulsators and the vacuum pulsator milking devices. The valves 91 and 95 on the portable vacuum receiving tank 92 are closed to seal the milk therein under vacuum and then the connections to the valves 91 and 95 are removed. The milk is then transported at substantially body temperature under vacuum in the vacuum receiving tank to the central processing plant.

The apparatus of this invention following milking may be readily and simply cleaned, this being accomplished by circulating a suitable cleaning fluid through the apparatus. In this connection, a cleaning fluid circulating apparatus is included in the system. It includes a sump 100 in the form of a wash sink which is connected through a T-fitting 102 and a pipe 104 to the inlet side of a pump 105 driven by a motor 106. The T-fitting 102 may also connect to the drain through a shut-off valve 103. The outlet of the pump 105 is connected to the three-way valve 87. The three-way valve 85 is connected by a pipe 101 to the sump 100. When it is desired to circulate the cleaning fluid through the apparatus of this invention a removable bridge connection 109, as illustrated in Fig. 1a, is connected to the detachable connections 89 and 97 and the three-way valves 85 and 87 are manipulated. The three-way valves 21 are also manipulated to connect the weigh jars 18 to the vacuum line 16 and the valves 25 are manipulated to connect the weigh jars 18 to the milk line 24. Cleaning fluid is then pumped from the sump 100 through the pump 105, three-way valve 87, removable bridge connection 109, milk line 24, milk connections 23 and valves 25, weigh jars 87, vacuum connections 20 and three-way valves 21, vacuum line 16 and three-way valve 85 and pipe 100 to the sump. After the cleaning fluid has been so circulated for cleaning the apparatus it may be drained through the shutoff valve 103.

Provision is also made for circulating rinse water through the apparatus. In this connection, hot and cold water supply pipes 111 and 112 are utilized. The hot water supply pipe is connected through T-fitting 113, shut-off valve 114 and T-fitting 115 to the T-fitting 88. The cold water pipe 112 is connected through a T-fitting 116, shut-off valve 117 and T-fitting 115 to T-fitting 88.

Thus the rinse water, at the desired temperature, may be circulated through this same path for rinsing the apparatus following cleaning therein, the rinse water going to the drain through the sump 100 and shut-off valve 103.

Warm water may be supplied to the milking parlor for purposes of washing the cows udders and various equipment in the milking parlor through the T-fittings 113 and 116, thermostatic mixing valve 119, a pipe 120 having fittings 121 and hoses 122 having spray nozzles 123.

By utilizing the cleaning arrangement of this invention it is not necessary to take down the sanitary milk line and associated equipment following each milking of the herd, this only being required at infrequent intervals. By reason of the milking and collecting apparatus of this invention and the manner of cleaning the same, in accordance with this invention milk is withdrawn from the cows and collected under vacuum, the milk having an extremely low gas content and an extremely low bacteria count. The milk so withdrawn and collected is particularly adaptable for use in the process disclosed in my aforementioned copending application Ser. No. 95,225.

While for purposes of illustration one form of this invention has been disclosed, other forms thereof may become apparent to those skilled in the art upon reference to this disclosure and, therefore, this invention is to be limited only by the scope of the appended claims.

I claim as my invention:

1. In a milking and collecting apparatus for withdrawing milk from cows and collecting the withdrawn milk all without contact with air including a vacuum pulsator milking device for withdrawing milk from the cows without contact with air, a transparent weigh jar for the vacuum milking device for inspecting and weighing the withdrawn milk without contact with air, a vacuum receiving tank for collecting the withdrawn milk from the weigh jar without contact with air, a vacuum line, a vacuum pump and a sanitary milk line, in combination therewith, vacuum connections between the vacuum pump, the vacuum line and the vacuum receiving tank for creating a vacuum in the vacuum line and in the vacuum receiving tank, a milk connection between the sanitary milk line and the vacuum receiving tank for creating a vacuum in the sanitary milk line and to withdraw milk therefrom into the vacuum receiving tank, a three-way valve for the weigh jar connected to the vacuum line, a connection to the three-way valve from a source of gas having a pressure higher than the vacuum pressure, a connection between the three-way valve and its associated weigh jar, said three-way valve communicating said weigh jar selectively with the vacuum line or the source of gas to create a vacuum or higher pressure therein, a combination valve on the bottom of the weigh jar and having a pair of two-way valve portions communicating with the interior of the weigh jar, a milk connection between the associated vacuum milking device and one of the two-way valve portions, and a milk connection between the other two-way valve portion and the sanitary milk line, said combination valve when in a first position establishing communication between the vacuum milking device and the weigh jar to withdraw by vacuum milk into the weigh jar and when in a second position establishing communication between the weigh jar and the sanitary milk line to withdraw by vacuum milk from the weigh jar into the sanitary milk line.

2. In a milking and collecting apparatus for withdrawing milk from cows and collecting the withdrawn milk all without contact with air including a vacuum pulsator milking device for withdrawing milk from the cows without contact with air, a transparent weigh jar for the vacuum milking device for inspecting and weighing the withdrawn milk without contact with air, a vacuum receiving tank for collecting the withdrawn milk from the weigh jar without contact with air, a vacuum line, a vacuum pump and a sanitary milk line, in combination therewith, vacuum connections between the vacuum pump, the vacuum line and the vacuum receiving tank for creating a vacuum in the vacuum line and in the vacuum receiving tank, a milk connection between the sanitary milk line and the vacuum receiving tank for creating a vacuum in the sanitary milk line and to withdraw milk therefrom into the vaccum receiving tank, a three-way valve for the weigh jar connected to the vacuum line, a connection to the three-way valve from a source of gas having a pressure higher than the vacuum pressure, a connection between the three-way valve and its associated weigh jar, said three-way valve communicating said weigh jars selectively with the vacuum line or the source of gas to create a vacuum or higher pressure therein, a combination valve on the bottom of the weigh jar and having a pair of two-way valve portions communicating with the interior of the weigh jar, a milk connection between the associated vacuum milking device and one of the two-way valve portions, a milk connection between the other two-way valve portion and the sanitary milk line, said combination valve when in a first position establishing communication between the vacuum milking device and the weigh jars to withdraw by vacuum milk into the weigh jar and when in a second position establishing communication between the weigh jar and the sanitary milk line to withdraw by vacuum milk from the weigh jar into the sanitary milk line, and a vent port in said one two-way valve portion of the combination valve for venting the vacuum milking device to atmosphere when the combination valve is moved out of the first position.

3. In a milking and collecting apparatus for withdrawing milk from cows and collecting the withdrawn milk all without contact with air including a plurality of vacuum pulsator milking devices for withdrawing milk from the cows without contact with air, a transparent weigh jar for each vacuum milking device for inspecting and weighing the withdrawn milk without contact with air, a vacuum receiving tank for collecting the withdrawn milk from the weigh jars without contact with air, a vacuum line, a vacuum pump and a sanitary milk line, in combination therewith, a vacuum connection between the vacuum pump and the vacuum line for creating a vacuum therein, a detachable vacuum connection between the vacuum receiving tank and the connection between the vacuum pump and vacuum line for creating a vacuum in the vacuum receiving tank, a detachable milk connection between the sanitary milk line and the vacuum receiving tank for creating a vacuum in the sanitary milk line and to withdraw milk therefrom into the vacuum receiving tank, a vacuum connection between each weigh jar and the vacuum line including a valve for controlling the connection, a milk connection between the associated vacuum milking devices and weigh jars including a valve for controlling each connection, a milk connection between the weigh jars and the sanitary milk line including a valve for controlling each connection, manipulation of said valves controlling the transfer of milk without contact with air from the vacuum milking devices to the weigh jars and to the sanitary milk line and hence the vacuum receiving tank, a detachable by-pass connection between the sanitary milk line and the connection between the vacuum pump and vacuum line operable when the detachable connections to the vacuum receiving tank are detached, a cleaning fluid circulating apparatus including a pump, cleaning fluid connections between the cleaning fluid circulating apparatus and the vacuum connection between the vacuum pump and the vacuum line and the vacuum connection between the vacuum pump and the by-pass connection, and valve means in the cleaning fluid connections for circulating cleaning fluid through the detachable by-pass connection, the sanitary milk line, the weigh jars and the vacuum line.

4. In a milking and collecting apparatus for withdrawing milk from cows and collecting the withdrawn milk all without contact with air including a plurality of vacuum pulsator milking devices for withdrawing milk from the cows without contact with air, a transparent weigh jar for each vacuum milking device for inspecting and weighing the withdrawn milk without contact with air, a vacuum receiving tank for collecting the withdrawn milk from the weigh jars without contact with air, a vacuum line, a vacuum pump and a sanitary milk line, in combination therewith, a vacuum connection between the vacuum pump and the vacuum line for creating a vacuum therein, a detachable vacuum connection between the vacuum receiving tank and the connection between the vacuum pump and vacuum line for creating a vacuum in the vacuum receiving tank, a detachable milk connection between the sanitary milk line and the vacuum receiving tank for creating a vacuum in the sanitary milk line and to withdraw milk therefrom into the vacuum receiving tank, a three-way valve for each weigh jar connected to the vacuum line, a connection to each three-way valve from a source of gas having a pressure higher than the vacuum pressure, a connection between each three-way valve and its associated weigh jar, said three-way valves communicating said weigh jars selectively with the vacuum line or the source of gas to create a vacuum or higher pressures therein, a combination valve on the bottom of each weigh jar and having a pair of two-way valve portions communicating with the interior of the weigh jar, a milk connection between the associated vacuum milking device and one of the two-way valve portions, a milk connection between the other two-way valve portion and the sanitary milk line, said combination valves when in a first position establishing communication between the vacuum milking devices and the weigh jars to withdraw by vacuum milk into the weigh jars and when in a second position establishing communication between the weigh jars and the sanitary milk line to withdraw by vacuum milk from the weigh jars into the sanitary milk line, a detachable by-pass connection between the sanitary milk line and the connection between the vacuum pump and vacuum line operable when the detachable connections to the vacuum receiving tank are detached, a cleaning fluid circulating apparatus including a pump, cleaning fluid connections between the cleaning fluid circulating apparatus and the vacuum connection between the vacuum pump and the vacuum line and the vacuum connection between the vacuum pump and the by-pass connection, and valve means in the cleaning fluid connections for circulating cleaning fluid through the detachable by-pass connection, the sanitary milk line, the weigh jars and the vacuum line.

5. In a milking and collecting apparatus for withdrawing milk from cows and collecting the withdrawn milk all without contact with air including a plurality of vacuum pulsator milking devices for withdrawing milk from the cows without contact with air, a transparent weigh jar for each vacuum milking device for inspecting and weighing the withdrawn milk without contact with air, a vacuum receiving tank for collecting the withdrawn milk from the weigh jars without contact with air, a vacuum line, a vacuum pump and a sanitary milk line, in combination therewith, vacuum connections between the vacuum pump, the vacuum line and the vacuum receiving tank for creating a vacuum in the vacuum line and in the vacuum receiving tank, a milk connection between the sanitary milk line and the vacuum receiving tank for creating a vacuum in the sanitary milk line and to withdraw milk therefrom into the vacuum receiving tank, a vacuum connection between each weigh jar and the vacuum line including a valve for controlling the connection, a milk connection between the associated vacuum milking devices and weigh jars including a valve for controlling each connection, a milk connection between the weigh jars and the sanitary milk line including a valve for controlling each connection, manipulation of said valves controlling the transfer of milk without contact with air from the vacuum milking devices to the weigh jars and to the sanitary milk line and hence the vacuum receiving tank, a cleaning fluid circulating apparatus including a pump, and connections including valve means for connecting the cleaning fluid circulating apparatus to the sanitary milk line and the vacuum line for circulating cleaning fluid through the sanitary milk line, the weigh jars and the vacuum line.

6. In a milking and collecting apparatus for withdrawing milk from cows and collecting the withdrawn milk all without contact with air including a plurality of vacuum pulsator milking devices for withdrawing milk from the cows without contact with air, a transparent weigh jar for each vacuum milking device for inspecting and weighing the withdrawn milk without contact with air, a vacuum receiving tank for collecting the withdrawn milk from the weigh jars without contact with air, a vacuum line, a vacuum pump and a sanitary milk line, in combination therewith, vacuum connections between the vacuum pump, the vacuum line and the vacuum receiving tank for creating a vacuum in the vacuum line and in the vacuum receiving tank, a milk connection between the sanitary milk line and the vacuum receiving tank for creating a vacuum in the sanitary milk line and to withdraw milk therefrom into the vacuum receiving tank, a three-way valve for each weigh jar connected to the vacuum line, a connection to each three-way valve from a source of gas having a pressure higher than the vacuum pressure, a connection between each three-way valve and its associated weigh jar, said three-way valves communicating said weigh jars selectively with the vacuum line or the source of gas to create a vacuum or higher pressures therein, a combination valve on the bottom of each weigh jar and having a pair of two-way valve portions communicating with the interior of the weigh jar, a milk connection between the associated vacuum milking device and one of the two-way valve portions, a milk connection between the other two-way valve portion and the sanitary milk line, said combination valves when in a first position establishing communication between the vacuum milking devices and the weigh jars to withdraw by vacuum milk into the weigh jars and when in a second position establishing communication between the weigh jars and the sanitary milk line to withdraw by vacuum milk from the weigh jars into the sanitary milk line, a cleaning fluid circulating apparatus including a pump, and connections including valve means for connecting the cleaning fluid circulating apparatus to the sanitary milk line and the vacuum line for circulating cleaning fluid through the sanitary milk line, the weigh jars and the vacuum line.

7. In a milking and collecting apparatus for withdrawing milk from cows and collecting the withdrawn milk all without contact with air including a plurality of vacuum pulsator milking devices for withdrawing milk from the cows without contact with air, a transparent weigh jar for each vacuum milking device for inspecting and weighing the withdrawn milk without contact with air, a vacuum receiving tank for collecting the withdrawn milk from the weigh jars without contact with air, a vacuum line, a vacuum pump and a sanitary milk line, in combination therewith, a vacuum pipe connected to the pump and the vacuum line for creating a vacuum in the vacuum line, a detachable vacuum connection between the vacuum pipe and the vacuum receiving tank for creating a vacuum in the receiving tank, a detachable milk connection between the sanitary milk line and the vacuum receiving tank for creating a vacuum in the sanitary milk line and for withdrawing milk therefrom into the vacuum receiving tank, a vacuum connection between each weigh jar and the vacuum line including a valve for controlling the connection, a milk connection between the associated vacuum milking devices and weigh jars including a valve for controlling each connection, a milk connection between the weigh jars and the sanitary milk line including a valve for controlling each connection, manipulation of said valves controlling the transfer of milk without contact with air from the vacuum milking devices to the weigh jars and to the sanitary milk line and hence the vacuum receiving tank, a detachable by-pass connection between the sanitary milk line and the vacuum pipe operable when the detachable connections to the vacuum receiving tank are detached, a cleaning fluid circulating apparatus including a sump and a circulating pump connected thereto, a cleaning fluid connection between the sump and the vacuum pipe at a point between the vacuum pump and the vacuum line, a cleaning fluid connection between the pump and the vacuum pipe at a point between the vacuum line and the detachable connection to the vacuum pipe, and valve means in the vacuum pipe and cleaning fluid connections for circulating cleaning fluid from the pump through the detachable by-pass connection, the sanitary milk line, the weigh jars and the vacuum line to the sump.

8. In a milking and collecting apparatus for withdrawing milk from cows and collecting the withdrawn milk all without contact with air including a plurality of vacuum pulsator milking devices for withdrawing milk from the cows without contact with air, a transparent weigh jar for each vacuum milking device for inspecting and weighing the withdrawn milk without contact with air, a vacuum receiving tank for collecting the withdrawn milk from the weigh jars without contact with air, a vacuum line, a vacuum pump and a sanitary milk line, in combination therewith, a vacuum pipe connected to the pump and the vacuum line for creating a vacuum in the vacuum line, a detachable vacuum connection between the vacuum pipe and the vacuum receiving tank for creating a vacuum in the receiving tank, a detachable milk connection between the sanitary milk line and the vacuum receiving tank for creating a vacuum in the sanitary milk line and for withdrawing milk therefrom into the vacuum receiving tank, a three-way valve for each weigh jar connected to the vacuum line, a connection to each three-way valve from a source of gas having a pressure higher than the vacuum pressure, a connection between each three-way valve and its associated weigh jar, said three-way valves communicating said weigh jars selectively with the vacuum line or the source of gas to create a vacuum or higher pressures therein, a combination valve on the bottom of each weigh jar and having a pair of two-way valve portions communicating with the interior of the weigh jar, a milk connection between the associated vacuum milking device and one of the two-way valve portions, a milk connection between the other two-way valve portion and the sanitary milk line, said combination valves when in a first position establishing communication between the vacuum milking devices and the weigh jars to withdraw by vacuum milk into the weigh jars and when in a second position establishing communication between the weigh jars and the sanitary milk line to withdraw by vacuum milk from the weigh jars into the sanitary milk line, a detachable by-pass connection between the sanitary milk line and the vacuum pipe operable when the detachable connections to the vacuum receiving tank are detached, a cleaning fluid circulating apparatus including a sump and a circulating pump connected thereto, a cleaning fluid connection between the sump and the vacuum pipe at a point between the vacuum pump and the vacuum line, a cleaning fluid connection between the pump and the vacuum pipe at a point between the vacuum line and the detachable connection to the vacuum pipe, and valve means in the vacuum pipe and cleaning fluid connections for circulating cleaning fluid from the pump through the detachable by-pass connection, the sanitary milk line, the weigh jars and the vacuum line to the sump.

9. In a milking and collecting apparatus having a vacuum pulsator milking device, a vacuum line and a vacuum milk line for withdrawing milk from cows and collecting the withdrawn milk all without contact with air, in combination therewith, a transparent weigh jar having an open bottom and a closed top provided with a nipple to the vacuum line, a bottom closure plate having an annular resilient gasket engaging the lower open end of the weigh jar for closing and sealing the same, a milk inlet port in the bottom plate connected to the vacuum pulsator milking device, a tube extending upwardly from the milk inlet port to a point adjacent the closed top of the jar for delivering milk to the jar adjacent the closed top thereof, and a milk outlet port in the bottom plate connected to the vacuum milk line.

10. In a milking and collecting apparatus having a vacuum pulsator milking device, a vacuum line and a vacuum milk line for withdrawing milk from cows and collecting the withdrawn milk all without contact with air, in combination therewith, a transparent weigh jar having an open bottom and a closed top provided with a nipple connected to the vacuum line, a bottom closure plate having an annular resilient gasket engaging the lower open end of the weigh jar for closing and sealing the same, a milk inlet port in the bottom plate, a tube extending upwardly from the milk inlet port to a point adjacent the closed top of the jar for delivering milk to the jar adjacent the closed top thereof, a milk outlet port in the bottom plate, a valve housing on the bottom plate having a bore communicating with the milk inlet and outlet ports, a milk inlet connection communicating with the bore adjacent the milk inlet port and connected to the vacuum pulsator milking device and a milk outlet connection communicating with the bore adjacent the milk outlet passage and connected to the vacuum milk line, and a rotatable valve plug in the bore of the valve housing having a pair of passages for communicating the milk inlet port and adjacent connection when in a first position and for communicating the milk outlet port and adjacent connection when in a second position.

11. In a milking and collecting apparatus having a vacuum pulsator milking device, a vacuum line and a vacuum milk line for withdrawing milk from cows and collecting the withdrawn milk all without contact with air, in combination therewith, a transparent weigh jar, a top plate, a bottom plate, a vacuum connection at the top of the jar connected to the vacuum line, a milk inlet port in the bottom plate, a tube extending upwardly from the milk inlet port to a point adjacent the top of the jar for delivering milk adjacent the top of the jar, a milk outlet port in the bottom plate, a valve housing on the bottom plate having a bore communicating with the milk inlet and outlet ports, a milk inlet connection communicating with the bore adjacent the milk inlet port and connected to the vacuum pulsator milking device and a milk outlet connection communicating with the bore adjacent the milk outlet passage and connected to the vacuum receiving tank, and a rotatable valve plug in the bore of the valve housing having a pair of passages for communicating the milk inlet port and adjacent connection when in a first position and for communicating the milk outlet port and adjacent connection when in a second position.

12. In a milking and collecting apparatus having a vacuum pulsator milking device, a vacuum line and a vacuum milk line for withdrawing milk from cows and collecting the withdrawn milk all without contact with air, in combination therewith, a transparent weigh jar, a top plate, a bottom plate, a vacuum connection at the top of the jar connected to the vacuum line, a milk inlet port in the bottom plate, a tube extending upwardly from the mlik inlet port to a point adjacent the top of the jar for delivering milk adjacent the top of the jar, a milk outlet port in the bottom plate, a valve housing on the bottom plate having a bore communicating with the milk inlet and outlet ports, a milk inlet connection communicating with the bore adjacent the milk inlet port and connected to the vacuum pulsator milking device and a milk outlet connection communicating with the bore adjacent the milk outlet passage and connected to the vacuum milk line, a rotatable valve plug in the bore of the valve housing having a pair of passages for communicating the milk inlet port and adjacent connection when in a first position and for communicating the milk outlet port and adjacent connection when in a second position, a vent port in the valve housing adjacent the milk inlet connection and communicated by one of the valve plug passages with the milk inlet connection when the valve plug is rotated out of its first position for venting the vacuum pulsator milking device to atmosphere.

13. In a milking and collecting apparatus having a vacuum pulsator milking device, a vacuum line and a vacuum milk line for withdrawing milk from cows and collecting the withdrawn milk all without contact with air, in combination therewith, a transparent weigh jar having an open bottom and a closed top provided with a nipple connected to the vacuum line, a bottom closure plate having an annular resilient gasket engaging the lower open end of the weigh jar for closing and sealing the same, a milk inlet port in the bottom plate, a tube extending upwardly from the milk inlet port to a point adjacent the closed top of the jar for delivering milk to the jar adjacent the closed top thereof, a milk outlet port in the bottom plate, a valve housing on the bottom plate having a bore communicating with the milk inlet and outlet ports, a milk inlet connection communicating with the bore adjacent the milk inlet port and connected to the vacuum pulsator milking device and a milk outlet connection communicating with the bore adjacent the milk outlet passage and connected to the vacuum milk line, a rotatable valve plug in the bore of the valve housing having a pair of passages for communicating the milk inlet port and adjacent connection when in a first position and for communicating the milk outlet port and adjacent connection when in a second position, a vent port in the valve housing adjacent the milk inlet connection and communicated by one of the valve plug passages with the milk inlet connection when the valve plug is rotated out of its first position for venting the vacuum pulsator milking device to atmosphere.

14. In a milking and collecting apparatus having a vacuum pulsator milking device, a vacuum line and a vacuum milk line for withdrawing milk from cows and collecting the withdrawn milk all without contact with air, in combination therewith, a transparent weigh jar, having an open bottom and a closed top provided with a nipple connected to the vacuum line, a bottom closure plate having an annular resilient gasket engaging the lower open end of the weigh jar for closing and sealing the same, a milk inlet port in the bottom plate connected to the vacuum pulsator milking device, a tube extending upwardly from the milk inlet port to a point adjacent the closed top of the jar for delivering milk to the jar adjacent the closed top thereof, a milk outlet port in the bottom plate connected to the vacuum milk line, a top plate having a central opening for receiving and engaging the closed top of the jar, tie rods extending between the top and bottom plates for securing said plates together with the jar therebetween, and a bail carried by the top plate for suspending the weigh jar.

15. In a milking and collecting apparatus having a vacuum pulsator milking device, a vacuum line and a vacuum milk line for withdrawing milk from cows and collecting the withdrawn milk all without contact with air, in combination therewith, a transparent weigh jar having an open bottom and a closed top provided with a nipple connected to the vacuum line, a bottom closure plate having an annular resilient gasket engaging the lower open end of the weigh jar for closing and sealing the same, a milk inlet port in the bottom plate, a tube extending upwardly from the milk inlet port to a point adjacent the closed top of the jar for delivering milk to the jar adjacent the closed top thereof, a milk outlet port in the bottom plate, a valve housing on the bottom plate having a bore communicating with the milk inlet and outlet ports, a milk inlet connection communicating with the bore adjacent the milk inlet port and connected to the vacuum pulsator milking device and a milk outlet connection communicating with the bore adjacent the milk outlet passage and connected to the vacuum milk line, a rotatable valve plug in the bore of the valve housing having a pair of passages for communicating the milk inlet port and adjacent connection when in a first position and for communicating the milk outlet port and adjacent connection when in a second position, a top plate having a central opening for receiving and engaging the closed top of the jar, tie rods extending between the top and bottom plates for securing said plates together with the jar therebetween, and a bail carried by the top plate for suspending the weigh jar.

16. In a milking and collecting apparatus having a vacuum pulsator milking device, a vacuum line and a vacuum milk line for withdrawing milk from cows and collecting the withdrawn milk all without contact with air, in combination therewith, a transparent weigh jar having an open bottom and a closed top provided with a nipple connected to the vacuum line, a bottom closure plate having an annular resilient gasket engaging the lower open end of the weigh jar for closing and sealing the same, a milk inlet port in the bottom plate, a tube extending upwardly from the milk inlet port to a point adjacent the closed top of the jar for delivering milk to the jar adjacent the closed top thereof, a milk outlet port in the bottom plate, a valve housing on the bottom plate having a bore communicating with the milk inlet and outlet ports, a milk inlet connection communicating with the bore adjacent the milk inlet port and connected to the vacuum pulsator milking device and a milk outlet connection communicating with the bore adjacent the milk outlet passage and connected to the vacuum milk line, a rotatable valve plug in the bore of the valve housing having a pair of passages for communicating the milk inlet port and adjacent connection when in a first position and for communicating the milk outlet port and adjacent connection when in a second position, a vent port in the valve housing adjacent the milk inlet connection and communicated by one of the valve plug passages with the milk inlet connection when the valve plug is rotated out of its first position for venting the vacuum pulsator milking device to atmosphere, a top plate having a central opening for receiving and engaging the closed top of the jar, tie rods extending between the top and bottom plates for securing said plates together with the jar therebetween, and a bail carried by the top plate for suspending the weigh jar.

17. In a milking and collecting apparatus for withdrawing milk from cows and collecting the withdrawn milk all without contact with air including a vacuum pulsator milking device for withdrawing milk from the cows without contact with air, a transparent weigh jar for the vacuum milking device for inspecting and weighing the withdrawn milk without contact with air, a vacuum receiving tank for collecting the withdrawn milk from the weigh jar without contact with air, a vacuum line and a sanitary milk line, in combination therewith, a depending branch on the vacuum line adjacent the weigh jar, a ball check valve terminating the depending branch, a vacuum connection between the depending branch and its associated weigh jar including a valve for controlling the connection, a milk connection between the associated vacuum pulsator milking device and weigh jar including a valve for controlling the connection, and a milk connection between the weigh jar and the sanitary milk line including a valve for controlling the connection.

18. In a milking and collecting apparatus for withdrawing milk from cows and collecting the withdrawn milk all without contact with air including a plurality of vacuum pulsator milking devices for withdrawing milk from the cows without contact with air, a transparent weigh jar for each vacuum milking device for inspecting and weighing the withdrawn milk without contact with air, a vacuum receiving tank for collecting the withdrawn milk from the weigh jars without contact with air, a vacuum line and a sanitary milk line, in combination therewith, a branch on the vacuum line adjacent each weigh jar, a ball check valve terminating each branch, a vacuum connection between each branch and its associated weigh jar including a valve for controlling each connection, a milk connection between the associated vacuum pulsator milking devices and weigh jars including a valve for controlling each connection, a milk connection between each of the weigh jars and the sanitary milk line including a valve for controlling each connection, a magnetic pulsator for each vacuum pulsator milking device located adjacent thereto and connected therewith, a vacuum connection between each magnetic pulsator and its associated branch at a point adjacent the ball check valve, and a valve in each branch between the vacuum connection to the magnetic pulsator and the vacuum connection to the weigh jar.

19. In a milking and collecting apparatus for withdrawing milk from cows and collecting the withdrawn milk all without contact with air including a plurality of vacuum pulsator milking devices for withdrawing milk from the cows without contact with air, a transparent weigh jar for each vacuum milking device for inspecting and weighing the withdrawn milk without contact with air, a vacuum receiving tank for collecting the withdrawn milk from the weigh jars without contact with air, a vacuum line, a vacuum pump and a sanitary milk line, in combination therewith, vacuum connections between the vacuum pump, the vacuum line and the vacuum receiving tank for creating a vacuum in the vacuum line and in the vacuum receiving tank, a milk connection between the sanitary milk line and the vacuum receiving tank for creating a vacuum in the sanitary milk line and to withdraw milk therefrom into the vacuum receiving tank, a vacuum connection between each weigh jar and the vacuum line including a valve for controlling each connection, a milk connection between the associated vacuum pulsator milking devices and weigh jars including a valve for controlling each connection, a milk connection between each of the weigh jars and the sanitary milk line including a valve for controlling each connection, a magnetic pulsator for each vacuum pulsator milking device located adjacent thereto and connected therewith, a vacuum connection between each magnetic pulsator and the vacuum line including a valve for controlling each connection, a cleaning fluid circulating apparatus including a pump, and connections including valve means for connecting the cleaning fluid circulating apparatus to the sanitary milk line and the vacuum line for circulating cleaning fluid through the sanitary milk line, the weigh jars and the vacuum line.

20. In a milking and collecting apparatus for withdrawing milk from cows and collecting the withdrawn milk all without contact with air including a plurality of vacuum pulsator milking devices for withdrawing milk from the cows without contact with air, a transparent weigh jar for each vacuum milking device for inspecting and weighing the withdrawn milk without contact with air, a vacuum receiving tank for collecting the withdrawn milk from the weigh jars without contact with air, a vacuum line, a vacuum pump and a sanitary milk line, in combination therewith, vacuum connections between the vacuum pump, the vacuum line and the vacuum receiving tank for creating a vacuum in the vacuum line and in the vacuum receiving tank, a milk connection between the sanitary milk line and the vacuum receiving tank for creating a vacuum in the sanitary milk line and to withdraw milk therefrom into the vacuum receiving tank, a branch on the vacuum line adjacent each weigh jar, a ball check valve terminating each branch, a vacuum connection between each branch and its associated weigh jar including a valve for controlling each connection, a milk connection between the associated vacuum pulsator milking devices and weigh jars including a valve for controlling each connection, a milk connection between each of the weigh jars and the sanitary milk line including a valve for controlling each connection, a magnetic pulsator for each vacuum pulsator milking device located adjacent thereto and connected therewith, a vacuum connection between each magnetic pulsator and its associated branch at a point adjacent the ball check valve, a valve in each branch between the vacuum connection to the magnetic pulsator and the vacuum connection to the weigh jar, a cleaning fluid circulating apparatus including a pump, and connections including valve means for connecting the cleaning fluid circulating apparatus to the sanitary milk line and the vacuum line for circulating cleaning fluid through the sanitary milk line, the weigh jars and the vacuum line.

21. A milk processing apparatus comprising a milking machine, a weigh jar including transparent side walls and top and bottom walls, a vacuum connection in the top wall of the weigh jar, a milk inlet port in the bottom wall of the weigh jar and having a tube extending upwardly to a point adjacent the top wall of the weigh jar, a milk outlet port in the bottom wall of the weigh jar, a milk connection between the milking machine and the milk inlet port of the weigh jar for drawing milk from the milking machine to the weigh jar, a milk connection extending from the milk outlet port of the weigh jar for drawing milk from the weigh jar, and valve means in the milk connections for opening and closing the milk connections.

22. A milk processing apparatus comprising a milking machine, a weigh jar including transparent side walls and top and bottom walls, a vacuum connection in the top wall of the weigh jar, a milk inlet port in the bottom wall of the weigh jar and having a tube extending upwardly to a point adjacent the top wall of the weigh jar, a milk outlet port in the bottom wall of the weigh jar, a milk connection between the milking machine and the milk inlet port of the weigh jar for drawing milk from the milking machine to the weigh jar, a milk connection extending from the milk outlet port of the weigh jar for drawing milk from the weigh jar, and valve means in the milk connections for opening and closing the milk connections, said valve means including means for venting the milking machine to atmosphere when the valve means is operated to close the milk connection between the milking machine and the weigh jar to facilitate removal of the milking machine.

References Cited in the file of this patent

UNITED STATES PATENTS

| Number | Name | Date |
|---|---|---|
| 45,486 | Gardner | Dec. 20, 1864 |
| 1,164,256 | Cameron | Dec. 14, 1915 |
| 1,393,387 | McCornack | Oct. 11, 1921 |
| 1,846,805 | Hapgood | Feb. 23, 1932 |
| 1,859,500 | Dinesen | May 24, 1932 |
| 1,972,144 | Hapgood | Sept. 4, 1934 |
| 1,977,511 | Graves | Oct. 16, 1934 |
| 2,021,591 | Corderoy | Nov. 19, 1935 |
| 2,102,267 | Hodsdon | Dec. 14, 1937 |
| 2,451,075 | De Carli | Oct. 12, 1948 |
| 2,558,628 | Redin | June 26, 1951 |
| 2,639,840 | Wons | May 26, 1953 |
| 2,667,855 | Scott | Feb. 2, 1954 |

FOREIGN PATENTS

| Number | Country | Date |
|---|---|---|
| 496,597 | Great Britain | Dec. 2, 1938 |
| 563,390 | Great Britain | Aug. 11, 1944 |